G. FORNACA.
MOTOR ROAD VEHICLE.
APPLICATION FILED NOV. 20, 1907.

1,054,104.

Patented Feb. 25, 1913.

WITNESSES:

INVENTOR:
Guido Fornaca,

UNITED STATES PATENT OFFICE.

GUIDO FORNACA, OF TURIN, ITALY, ASSIGNOR, BY MESNE ASSIGNMENTS, TO F. I. A. T., OF POUGHKEEPSIE, NEW YORK, A CORPORATION OF NEW YORK.

MOTOR ROAD-VEHICLE.

1,054,104.

Specification of Letters Patent.

Patented Feb. 25, 1913.

Application filed November 20, 1907. Serial No. 402,984.

*To all whom it may concern:*

Be it known that I, GUIDO FORNACA, engineer, a subject of the King of Italy, residing in Turin, Corso Dante 35, Italy, have invented certain new and useful Improvements in Motor Road-Vehicles, of which the following is a full, clear, and exact specification.

This invention relates to motor road vehicles in which the transmission gear is operated through a universal joint, and the said invention has for its especial object to simplify the construction of the rear portion of such vehicles and to increase its resistance and durability.

In motor road vehicles which are provided with universal-joint transmission, the rear axle is formed by a middle casing which is usually cast in two parts, the said casing having two cast, or welded, tubes bolted to it the outer ends of such tubes supporting the spring-brackets. In the interior of the casing is the speed reducing bevel gear, the differential gear and the two parts of the divided axle the outer ends of which respectively support the wheels. The main transmitting shaft, which is connected with the driving-shaft by means of a simple or double, universal-joint, protrudes from the said casing free, or with a protecting cover, while, in order to give the necessary lateral stiffness to the rear axle, the said shaft is provided with a reinforcing arm, single, or double, journaled on the frame of the vehicle. When the rear part of this frame is formed of a large number of parts which are united only by means of joints, or bolts, it does not constitute a sufficiently stiff system, capable of preventing the deformations consequent upon jarring action.

Figure 1:
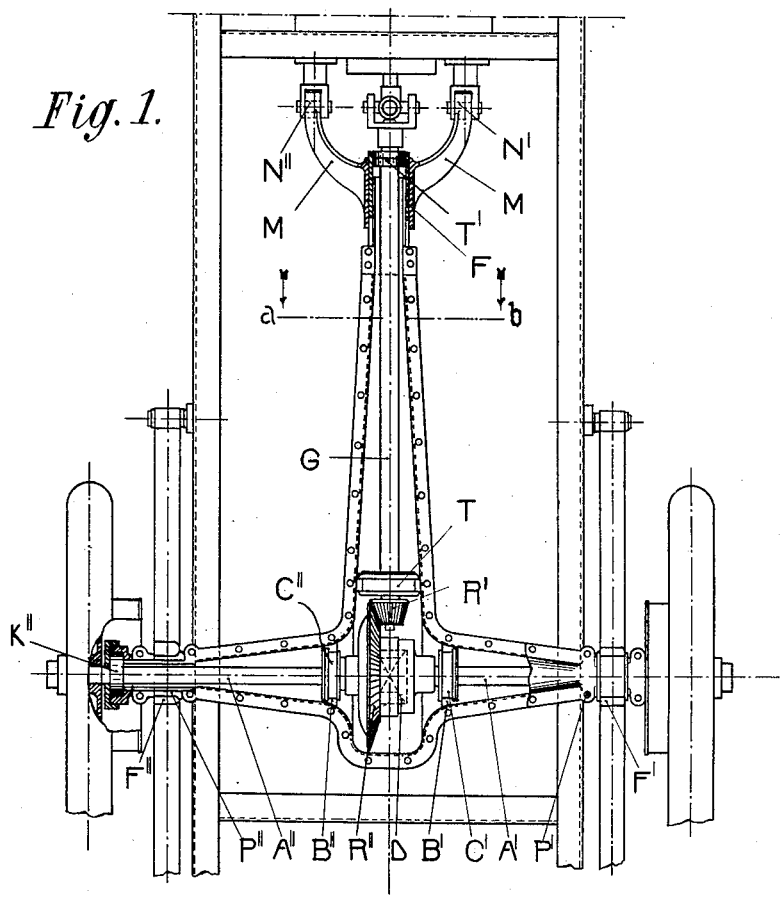
Figure 2:
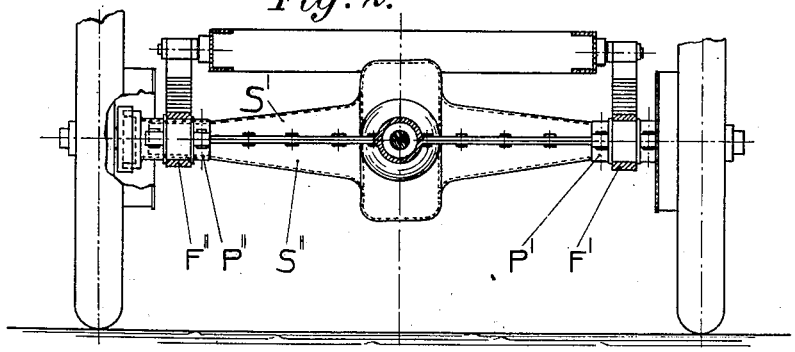

I will describe the present invention with reference to the accompanying drawing, Figure 1 being a plan and Fig. 2 an end view both partly in section.

The casing is made of stamped plate, composed of two parts S' and S" of corresponding figure in plan and having the form of a cross whose arms constitute the rear bridge, while the stem forms a reinforcing arm which is connected to the frame. The two parts of the casing S' S" are provided with lateral flanges by which they are fixed together by means of bolts, and nuts, the said flanges constituting a reinforcing-rib giving strength against lateral strain. The central part constitutes a box, in which are situated the speed-reducing bevel gear system R' R", and the differential gear D, while the parts A' and A" of the rear axle are supported at their inner end by the usual ball-bearings, C' and C", which, with the usual corresponding collar-thrust-bearings, are each of them situated inside a double-flanged case (B' and B") supported by two half-rings which are riveted to the casing so as to fix the cases in correct position. On the ends of each of the cross-arms is mounted a case (P' and P") each of which is rigidly fixed to a respective arm of the principal casing by means of bolts; each of the said cases (P' P") being provided at its extreme end, with grooves, for the exterior ball-bearings K" of the respective parts A' A" of the rear axle, while the exterior part of each of the said cases is mounted (with a somewhat loose fit) in the central bearings F' and F" respectively of the suspension spring of the frame.

The main transmission shaft G, which is provided at one end with the beveled pinion R' and at the other end with one of the forks of the universal-joint, is supported inside the casing, by the ball-bearing T (fixed to the casing as mentioned with regard to the aforesaid ball-bearings), and by the end bearing T', while near the forward end of the casing there is fixed, externally, a sleeve F on which is loosely mounted the two-armed bearing M capable of oscillating on the journals N' and N" carried by the rigid part of the frame and having their axes in the same horizontal plane with the center of the universal joint.

The casing, S' and S", constitutes a perfectly stiff system, and is nearly the equivalent, as regards strength, of a solid of uniform resistance. The whole system of the rear bridge can freely follow the oscillation of the suspension-springs of the vehicle oscillating in a vertical direction upon a center situated in the plane of the center of the universal joint while lateral strains, consequent on jarring action, are transmitted by means of the said casing to the bearing M fixed to the rigid part of the frame.

The construction hereinbefore described has also the advantage that the mounting of all the devices which are situated inside the casing, can be done without difficulty and with the advantage of seeing the whole lower portion of the casing, and its contents with the result of simpler and more exact work.

What I claim is:

1. An automobile axle composed of two longitudinal intermediately enlarged T-shaped sheet metal halves having horizontal flanges extending along each edge and adapted to fit to form a tubular body having opposite stiffening ribs said halves being adapted proximate the two opposite ends for carrying spring seats, and fastenings for holding said halves together.

2. A tubular automobile axle comprising longitudinal, flanged plate sections each having an intermediate enlarged portion the ends of said sections being adapted to receive bearing supports, fastening devices for securing said sections together, and a tubular shaft casing extending from said enlarged intermediate portion and carried in part by each section.

3. A pressed steel tubular automobile axle and driving shaft casing comprising a plurality of flanged T-shaped segments, the opposite ends of the axle carrying bearing supports.

4. As an article of manufacture, a channeled T-shaped stamping for an automobile driving axle, the said stamping having flat external stiffening flanges along the edges, the channels being of increasing depth and width from each end toward the junction.

In witness whereof, I have hereunto signed my name in the presence of two subscribing witnesses.

GUIDO FORNACA.

Witnesses:
 JOHN BAZETTA,
 LOUIS ALLAN.